United States Patent
Prum et al.

(10) Patent No.: US 9,215,953 B2
(45) Date of Patent: Dec. 22, 2015

(54) SEALED FILTERING AND MIXING JAR

(71) Applicants: Eric Christopher Prum, New York, NY (US); Joshua Kauffman Williams, New York, NY (US)

(72) Inventors: Eric Christopher Prum, New York, NY (US); Joshua Kauffman Williams, New York, NY (US)

( * ) Notice: Subject to any disclaimer, the term of this patent is extended or adjusted under 35 U.S.C. 154(b) by 90 days.

(21) Appl. No.: 13/848,991

(22) Filed: Mar. 22, 2013

(65) Prior Publication Data
US 2013/0248536 A1      Sep. 26, 2013

Related U.S. Application Data

(60) Provisional application No. 61/614,221, filed on Mar. 22, 2012.

(51) Int. Cl.
A47J 43/27    (2006.01)
A47J 43/00    (2006.01)

(52) U.S. Cl.
CPC . *A47J 43/27* (2013.01); *A47J 43/00* (2013.01)

(58) Field of Classification Search
CPC .................................. A47J 43/00; A47J 43/27
USPC .................. 220/254.1, 255, 256.1, 368, 568; 215/40; 366/130; D7/300.1
See application file for complete search history.

(56) References Cited

U.S. PATENT DOCUMENTS 5,547,275 A * 8/1996 Lillelund et al. .............. 366/130

* cited by examiner

*Primary Examiner* — Fenn Mathew
*Assistant Examiner* — Elizabeth Volz

(57) ABSTRACT

An apparatus for mixing drinks utilizing a mason jar, combining the jar and collar with a separate annular gasket, filtering lid, and sealing cap. The annular gasket and filtering lid are sealed to the jar by attaching the collar to the jar. A flange from the filtering lid sits atop the annular gasket, while a lip from the collar presses down on the flange as the collar is tightened. The collar is secured to the jar by matching threading on the jar and collar. The filtering lid has filtering holes that allow a drink inside the jar to be filtered while being poured. A sealing cap can be attached to a spout of the filtering lid by means of an interference fit. The sealing cap allows the mixing apparatus to be used to mix and shake a contained drink. The shaker is useful for creating cocktails, infusions, and similar drinks.

18 Claims, 6 Drawing Sheets

SEALED FILTERING AND MIXING JAR

The current application claims a priority to the U.S. Provisional Patent application Ser. No. 61/614,221 filed on Mar. 22, 2012.

FIELD OF THE INVENTION

The present invention relates generally to an apparatus for a drink mixer. More specifically, the present invention is an apparatus for a mason jar liquid mixer and dispenser.

BACKGROUND OF THE INVENTION

Mixed drinks, such as cocktails, are enjoyed by people round the world. The preparation of these drinks is aided by cocktail shakers, of which there are numerous varieties. Some versions merely combine a top and bottom section. While this is useful for sealing and mixing cocktail ingredients, these products require a separate strainer to be used. To address this inconvenience, other models have integrated straining functionality into the shaker itself, allowing mixing and straining to be achieved by the same product. However, the bodies of these and other solutions are often made of steel or other opaque materials. The opaque construction prevents a user from seeing the drink as it is mixed, which is disadvantageous when using visual cues to determine how much shaking a cocktail requires. Mason jars, invented over a century ago, are found throughout households today. Also known as canning jars, mason jars can easily be transformed into drink mixers. By providing a filter and sealing cap, mason jars can be used for drink mixing. Retrofitting a mason jar as such reduces clutter and is equally as effective as current products on the market. Before the present invention, no unique top and lid combination provided the ability to filter mixed drinks from glass jars, specifically mason jars.

It is therefore an object of the present invention to provide an apparatus that allows a simple glass jar to act as a sealing cocktail shaker. It is a further object of the present invention to provide a gasket, filtering lid, and cap to form part of the cocktail shaker. It is a further object of the present invention to provide a transparent cocktail shaker, allowing a user to see the contents.

DETAIL DESCRIPTIONS OF THE INVENTION

Figure 1:
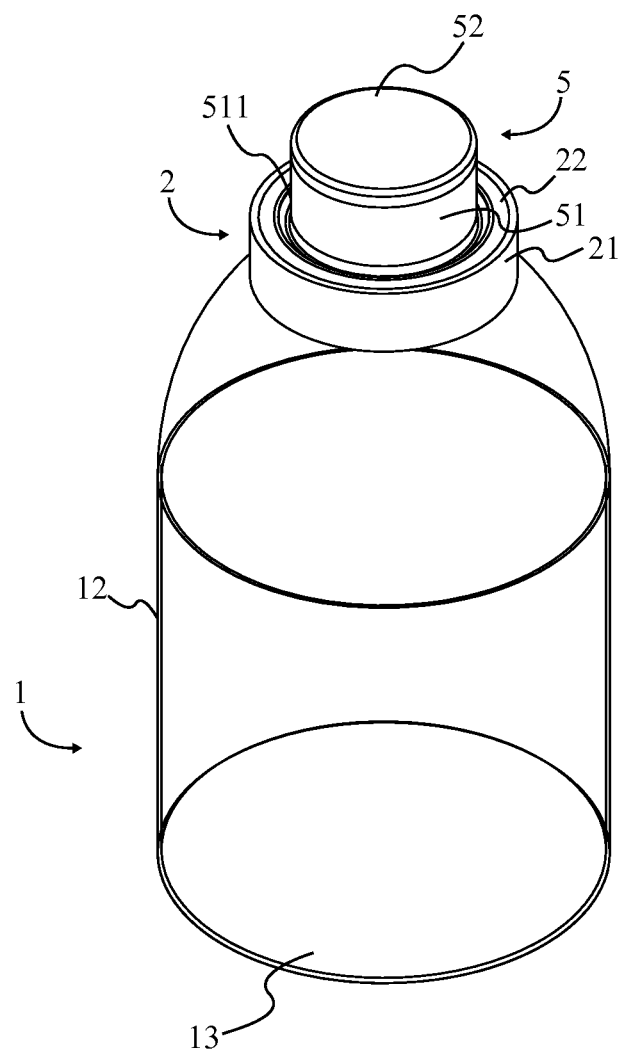
FIG. 1 is a perspective view of the present invention.

All illustrations of the drawings are for the purpose of describing selected versions of the present invention and are not intended to limit the scope of the present invention.

The present invention is an apparatus for mixing and filtering drinks, such as cocktails. The present invention comprises a jar 1, a collar 2, an annular gasket 3, a filtering lid 4, and a sealing cap 5. The annular gasket 3 and the filtering lid 4 are placed on the jar 1. The collar 2 is attached to the jar 1 and secures the annular gasket 3 and filtering lid 4 in place. The sealing cap 5 attaches to the filter lid. The combination of the annular gasket 3, filtering lid 4, and sealing cap 5 create a sealed volume within the jar 1, allowing the jar 1 to be used as a mixer, such as for cocktails. After mixing a cocktail the sealing cap 5 can be removed, and the cocktail is filtered as it is poured out of the jar 1 and through the filtering lid 4.

Figure 2:
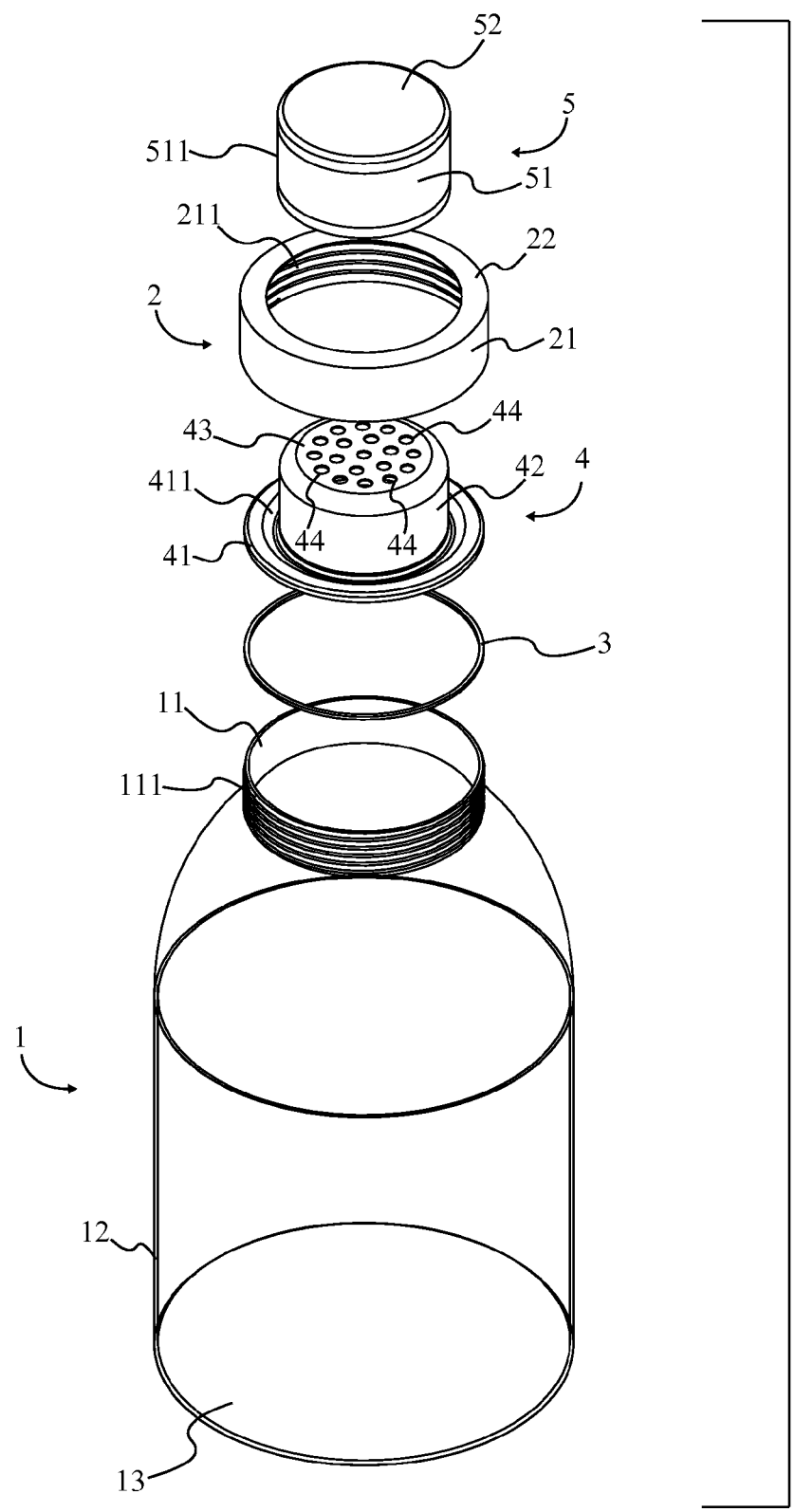
FIG. 2 is an exploded perspective view of the present invention.
Figure 3:
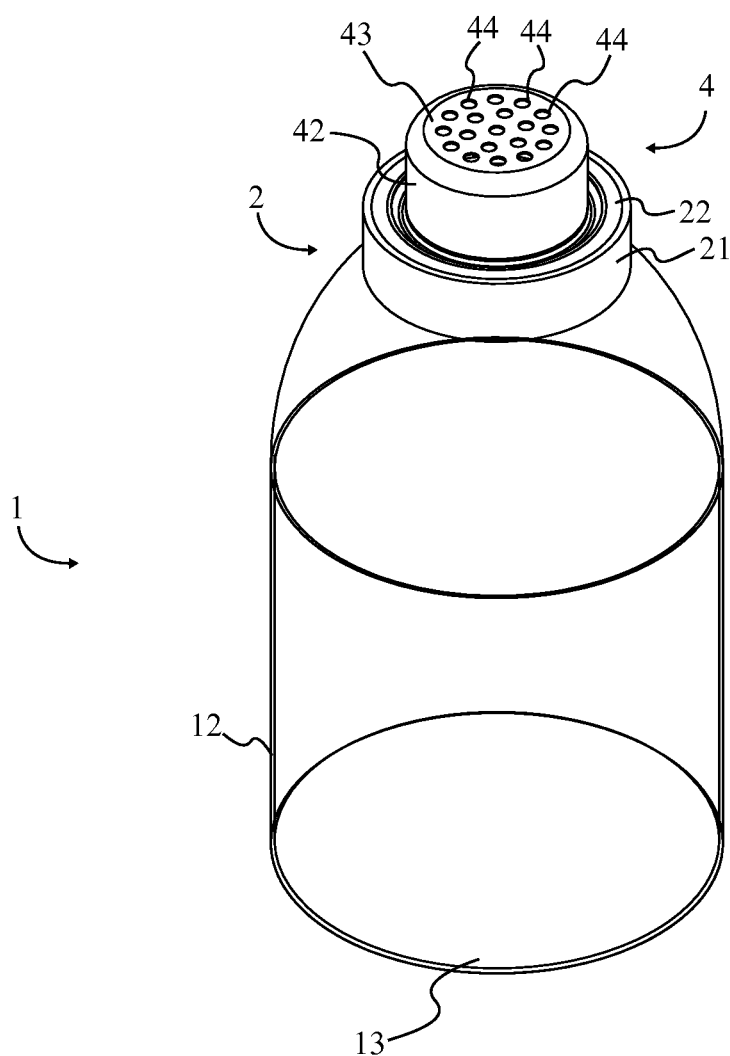
FIG. 3 is a perspective view of the present invention with the sealing cap omitted.

The jar 1, which holds the mixing ingredients, comprises an annular mouth 11, an annular jar wall 12, and a base 13. The annular jar wall 12 is connected to the base 13, with the connection being made around the perimeter of the base 13, as can be seen in FIG. 1, FIG. 2, and FIG. 3. At the top end of the jar 1, opposite the base 13, is the annular mouth 11. The annular mouth 11, visible in FIG. 2, comprises a jar threading 111. The jar threading 111 is helically patterned, connected around the exterior surface of the annular mouth 11.

In the preferred embodiment the jar 1 is made from glass. This provides a transparent container, which is useful for monitoring a drink as it is being mixed. In other embodiments a different material can be used, but it should be food safe, rigid, and transparent, in line with the present invention's intended use as a drink mixer. While the preferred embodiment employs a circular shape, in other embodiments the annular jar wall 12 can be a different shape, such as a square. However, while the annular jar wall 12 can be a different shape, the annular mouth 11 must remain circular. This is because the jar threading 111 must be helical, which requires the annular mouth 11 to be circular.

The collar 2, which attaches to the jar 1 and secures the annular gasket 3 and the filtering lid 4 to the jar 1, comprises an annular collar wall 21 and a lip 22. Depictions of the collar 2 are provided as parts of FIG. 1, FIG. 2, and FIG. 3. The lip 22 is perimetrically connected to the annular collar wall 21, forming an inward facing rim on the collar 2. Effectively, the lip 22 is positioned within the collar 2 and connected normal to an upper edge of the annular collar wall 21. Paralleling the annular mouth 11, the annular collar wall 21 comprises a collar threading 211. The collar threading 211 is connected along the annular collar wall 21, interior to the collar 2. The collar threading 211, being positioned within the collar 2, allows the collar 2 to be secured to the jar 1. This is done by screwing the collar 2 onto the top of the jar 1, such that the jar threading 111 and the collar threading 211 engage with each other.

In the preferred embodiment the collar 2 is circular in shape. This is necessary to allow the collar threading 211 to engage with the jar threading 111 on the annular jar 1 mouth. The collar 2 should be constructed from a rigid material, with sufficient strength to seal the annular gasket 3 and filtering lid 4 to the jar 1 when the collar 2 is attached to the jar 1.

Figure 4:
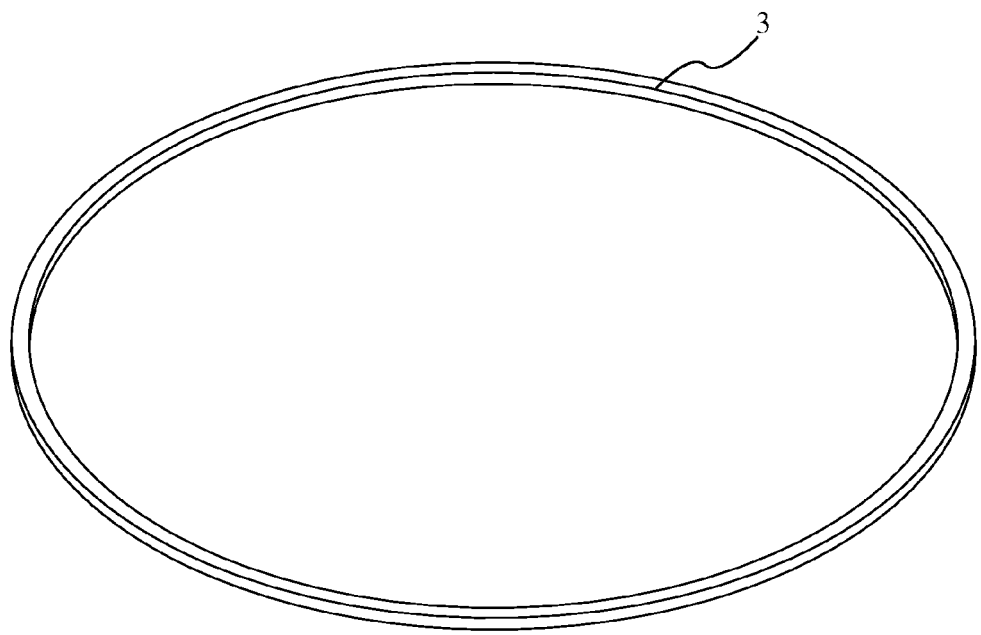
FIG. 4 is a perspective view of the annular gasket of the present invention.

The annular gasket 3, as seen in FIG. 2 and FIG. 4, is a ring shaped component that is designed to form a seal between the jar 1 and the filtering lid 4. Since the annular gasket 3 is compressed between the jar 1 and the filtering lid 4, it should be made from a pliable material. In the preferred embodiment the annular gasket 3 is constructed as a silicone seal. Other materials may be used in place of silicone, as long as these alternative materials are capable of creating a seal when pressed between the jar 1 and filtering lid 4.

Figure 5:
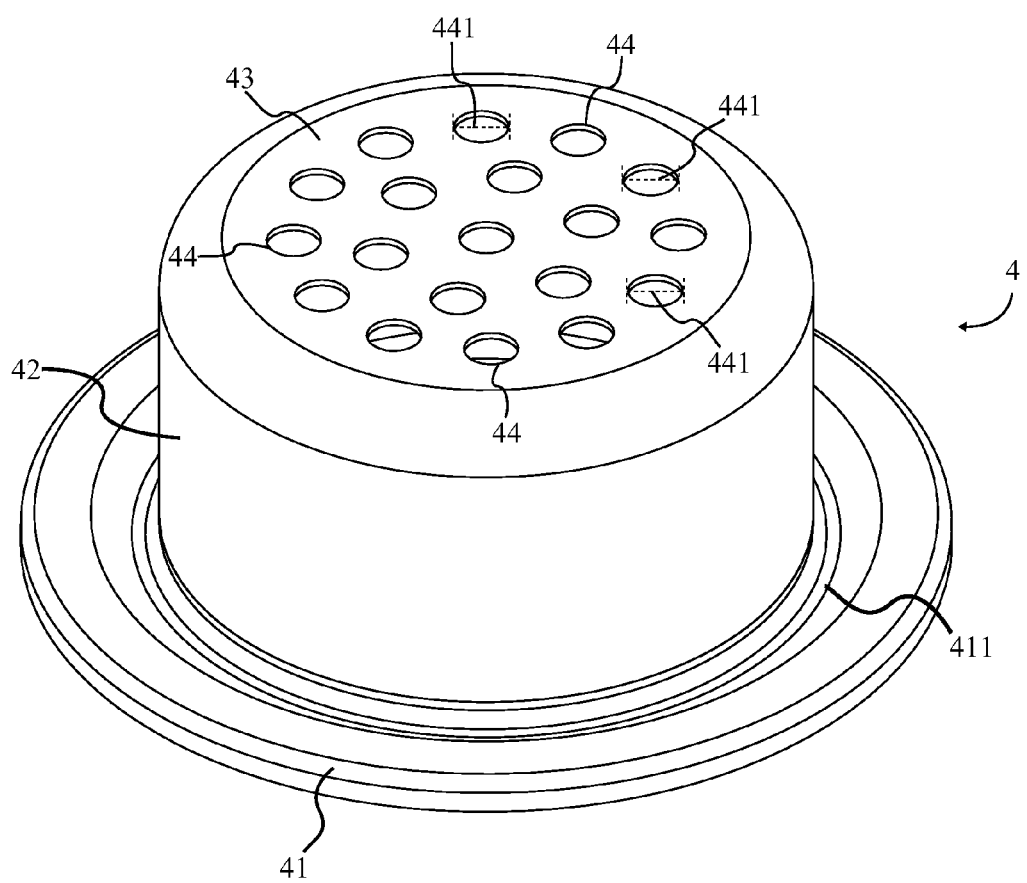
FIG. 5 is a perspective view of the filtering lid of the present invention.

The filtering lid 4, visible in FIG. 2, FIG. 3, and FIG. 5, provides the filtering function of the present invention. The filtering lid 4 comprises a flange 41, a spout 42, a filter top panel 43, and a plurality of holes 44, as illustrated in FIG. 5. The flange 41, spout 42, and filter top panel 43 form the body of the filtering lid 4. Connected around the spout 42, adjacent to a bottom edge, is the flange 41. At the opposite end of the spout 42, near the top, is the filter top panel 43. The spout 42 provides a flow path for the mixed drink, allowing fluid contents to flow from the jar 1, through the spout 42, and out of the plurality of holes 44. The filter top panel 43 is positioned within the spout 42, connected across the top edge of the spout 42. The flange 41 comprises a centering groove 411, which is positioned adjacent to and around the spout 42. The centering groove 411 forms a lowered section of the flange 41, and helps with placing the filtering lid 4 on the jar 1. When the filtering lid 4 is placed on the jar 1, the centering groove 411 keeps the filtering lid 4 from sliding past the edges of the annular mouth 11. The plurality of holes 44 is positioned on the filter top panel 43. The plurality of holes 44 are designed to allow liquid and finer particles to pass through, but to prevent larger elements such as ice from being poured through the filtering lid 4.

In the preferred embodiment, the plurality of holes 44 are circular in shape. The plurality of holes 44 have a diameter 441 of 4 millimeters, which has been found to be most effective for filtering. The plurality of holes 44 are patterned in concentric circles radiating outwards from a hole positioned in the center of the filter top panel 43. While other embodiments can vary the size, shape, and arrangement of the plurality of holes 44, the present invention employs a configuration that has been found to work best. For example, if the plurality of holes 44 were reduced in diameter 441, the filtering lid 4 would be more likely to clog when pouring mixed drinks, as larger particles have the potential to block the plurality holes. In another scenario, where the plurality of holes 44 are increased in diameter 441, the filtering lid 4 would function less effectively. This is because a larger diameter 441 would allow finer elements to pass through, rather than filtering the mixed drink as intended. While fine adjustments can be made to the plurality of holes 44, changes that are too drastic will lead to the aforementioned issues. Resultantly, the preferred embodiment utilizes the plurality of holes 44 with the indicated size, shape, and arrangement, even though alternative embodiments can alter the indicated qualities while still embodying the present invention.

Figure 6:
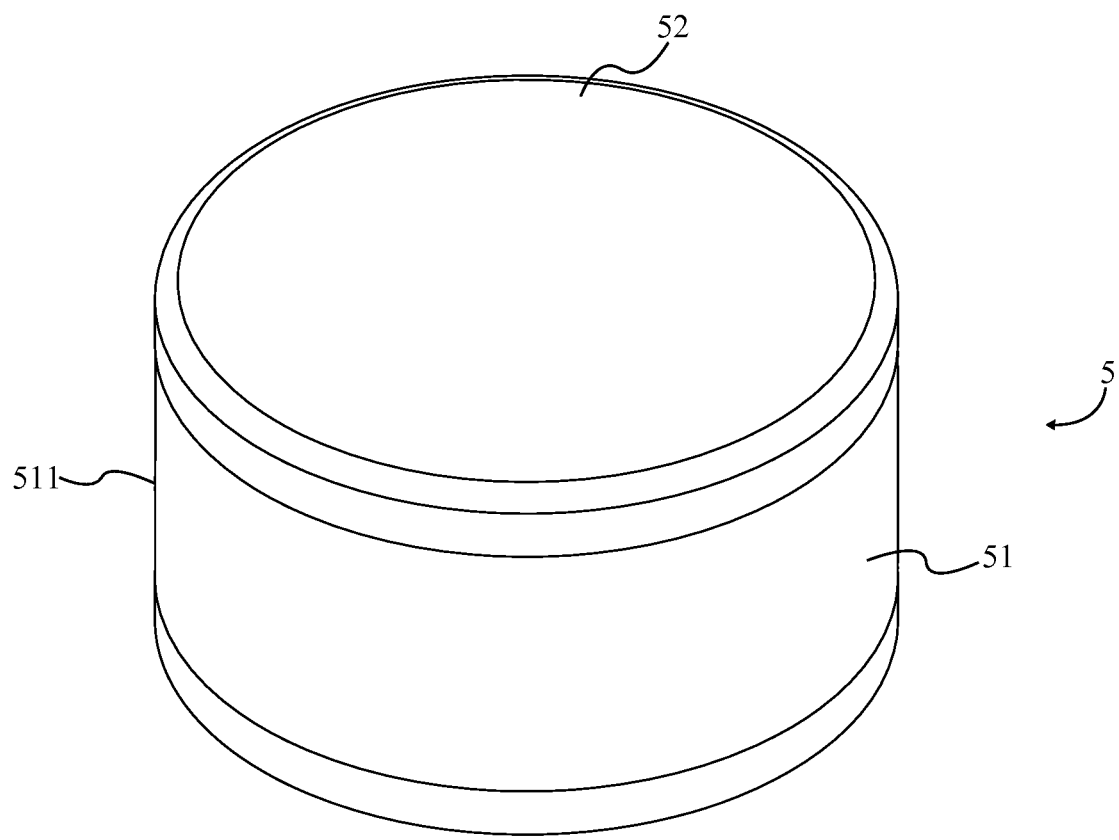
FIG. 6 is a perspective view of the sealing cap of the present invention.

Shown in FIG. 1, FIG. 2, and FIG. 6, the sealing cap 5 comprises an annular cap wall 51 and a cap top panel 52. The sealing cap 5 prevents the contents from being dispersed during shaking of the jar 1. The cap top panel 52 is connected to the top edge of the annular cap wall 51, positioned within the annular cap wall 51. Unlike the filter top panel 43, the cap top panel 52 is completely solid, without perforations of any kind. The sealing cap 5 is designed to attach to the filtering lid 4, with the spout 42 being inserted into the space delineated by the annular cap wall 51 and cap top panel 52.

In the preferred embodiment, the annular cap wall 51 comprises a slope 511. The slope 511, positioned circularly on the annular cap wall 51, is angled outward from the cap top panel 52, such that the annular cap wall 51 slightly widens as the distance between the annular cap wall 51 and the cap top panel 52 increases. This slope 511 is designed to press against the exterior of the spout 42, forming an interference fit between the sealing cap 5 and the filtering lid 4. An interference fit is the preferred method of attaching the sealing cap 5 to the filtering lid 4. In other embodiments, alternative methods of attaching the sealing cap 5 to the filtering lid 4 may be employed. For example, similar to the jar threading 111 and collar threading 211, the sealing cap 5 may be screwed onto the filtering lid 4 by means of an exterior spout threading and interior lid threading. Alternative embodiments can make use of this or any other method that provides the same functionality as the interference fit. The preferred embodiment uses an interference fit for ease of use, simplicity, and increased aesthetic appeal. The preferred embodiment utilizes the interference fit to secure the sealing cap 5 to the filtering lid 4, even though alternative embodiments can employ different attachment methods while still embodying the present invention.

The present invention is designed to mix drinks such as cocktails. Using cocktails as an example, the following instructions are provided to demonstrate use of the present invention. First, the ingredients for the cocktail are gathered and placed in the jar 1. Then, the annular gasket 3 is placed onto the mouth, around the rim. After the annular gasket 3 is in position, the filtering lid 4 is placed over the annular gasket 3 and mouth, with the centering groove 411 helping to ensure that the flange 41 overlays the annular mouth 11 and annular gasket 3.

Next, the collar 2 is attached to the jar 1. This is accomplished by screwing the collar 2 to the jar 1, with the collar threading 211 engaging with the jar threading 111 to tighten the collar 2 to the jar 1. The collar 2 is aligned with the jar 1, annular gasket 3, and filtering lid 4, such that the lip 22 is positioned above the flange 41. As the collar 2 is secured to the jar 1, the lip 22 of the collar 2 presses down on the flange 41 of the filtering lid 4 and the annular gasket 3. As the collar 2 is rotated to engage the collar threading 211 with the jar threading 111 and tight the attachment between the collar 2 and jar 1, the lip 22 imparts a downward force upon the flange 41. This downward force presses the flange 41 and the annular gasket 3 against the annular mouth 11, creating a seal between the aforementioned components. This seal prevents the contents of the jar 1 from leaking during the shaking process, which is described next.

Once the annular gasket 3, filtering lid 4, and collar 2 have been secured in place, the present invention is almost ready to be used as a mixing apparatus. To fully seal the jar 1, the sealing cap 5 is attached to the spout 42. In the preferred embodiment this is as simple as sliding the sealing cap 5 over the spout 42 until it is secured, a result of the interference fit that is used by the preferred embodiment. With the sealing cap 5 attached to the spout 42, the jar 1 is fully sealed and ready for mixing.

After attaching the sealing cap 5, a user can shake the present invention without fear of the contents leaking or splashing out. The user shakes the present invention until the contents have reached the desired appearance. Since the preferred embodiment is transparent, visual cues can be used to evaluate when the contents have been sufficiently mixed. After the cocktail has been mixed, the sealing cap 5 can be pulled off the spout 42, detaching it from the present invention. The mixed cocktail, ready for consumption, can then be poured into glasses, cups, or whatever serving containers are available.

Though the present invention has been described as being used for mixing cocktails, it can be utilized for different applications. Infusions are one such example. Infusions are increasingly common, with fresh fruits and herbs being used to flavor juices and plain or carbonated water. These infusions are created by placing ingredients, such as the aforementioned fruits and herbs, in a container with juice or water. The ingredients infuse the drink with flavor, which can then be enjoyed as a healthier alternative to overly sugar-laden drinks. If desired, a small amount of sugar can be added to sweeten the infusion. Using the present invention, the infusion can be prepared similarly to a cocktail, with the ingredients being placed into the jar 1 and mixed after the jar 1 is fully sealed. The infusion can then be poured into serving cups or into a pitcher, with the filtering lid 4 preventing the solid ingredients from being poured into the relevant receptacle. This is just one additional example of an application of the present invention.

The preferred embodiment of the present invention is based upon the mason jar 1, a common household item generally used for canning. The present invention utilizes the jar 1 and collar 2 of a mason jar 1 to provide an easy sealing system for a drink mixer, combining the aforementioned with an annular gasket 3, filtering lid 4, and sealing cap 5 to complete the drink mixer. Since mason jars are readily available, they are an obvious base 13 for the present invention. However, the present invention can be used with any jar 1 that has a corresponding collar 2; though mason jars are a convenient base 13, their sealing function can be replicated by a specially designed jar 1 and collar 2. Regardless of the embodiment, the present invention must retain the ability to sealably secure the annular gasket 3, filtering lid 4, and collar 2 to a jar 1 in order to function properly.

Although the invention has been explained in relation to its preferred embodiment, it is to be understood that many other possible modifications and variations can be made without departing from the spirit and scope of the invention as hereinafter claimed.

What is claimed is:

1. A sealed filtering and mixing jar comprises:
   a jar;
   a collar;
   a filtering lid;
   a sealing cap;
   the jar comprises an annular mouth;
   the collar comprises an annular collar wall and a lip;
   the filtering lid comprises a flange, a spout, a filter top panel, and a plurality of holes;
   the sealing cap comprises an annular cap wall and a cap top panel;
   the flange being adjacently connected around the spout;
   the filter top panel being positioned opposite the flange along the spout;
   the lip being positioned atop the flange;
   the flange, and the lip each being concentrically positioned with the annular mouth;
   the collar being attached to the jar;
   the sealing cap being attached to the filtering lid, wherein the sealing cap can be detached from the filtering lid;
   the annular mouth comprises a jar threading;
   the annular collar wall comprises a collar threading;
   the jar threading being helically connected around the annular mouth;
   the collar threading being helically connected within the annular collar wall;
   the jar threading being engaged with the collar threading;
   the annular cap wall comprises a slope;
   the annular cap wall being perimetrically connected to the cap top panel;
   the spout being positioned within the annular cap wall; and
   the slope being pressed against the spout.

2. The sealed filtering and mixing jar as claimed in claim 1 comprises:
   an annular gasket;
   the annular gasket being positioned onto the annular mouth;
   the annular gasket being concentrically positioned with the annular mouth;
   the annular mouth, the annular gasket, the flange, and the lip being serially positioned onto each other;
   the lip being perimetrically connected to the annular collar wall; and
   the annular gasket and the flange being secured between the annular mouth and the lip.

3. The sealed filtering and mixing jar as claimed in claim 1 comprises:
   the flange comprises a centering groove;
   the centering groove being positioned on the flange adjacent to the spout; and
   the centering groove being concentric with the spout.

4. The sealed filtering and mixing jar as claimed in claim 1 comprises:
   the jar further comprises an annular jar wall and a base;
   the annular jar wall being perimetrically connected to the base; and
   the annular mouth being positioned opposite the base along the annular jar wall.

5. The sealed filtering and mixing jar as claimed in claim 4 comprises:
   the jar being transparent.

6. The sealed filtering and mixing jar as claimed in claim 1 comprises:
   the plurality of holes being positioned across the filter top panel; and
   the plurality of holes traversing through the filter top panel.

7. The sealed filtering and mixing jar as claimed in claim 6 comprises:
   the plurality of holes being concentrically arranged on the filter top panel;
   each of the plurality of holes being circular; and
   each of the plurality of holes comprises a four millimeter diameter, wherein making the plurality of holes much larger hinders filtering, and making the plurality of holes much smaller results in clogging.

8. A sealed filtering and mixing jar comprises:
   a jar;
   a collar;
   an annular gasket;
   a filtering lid;
   a sealing cap;
   the jar comprises an annular mouth;
   the collar comprises an annular collar wall and a lip;
   the filtering lid comprises a flange, a spout, a filter top panel, and a plurality of holes;
   the sealing cap comprises an annular cap wall and a cap top panel;
   the flange being adjacently connected around the spout;
   the filter top panel being positioned opposite the flange along the spout;
   the plurality of holes being positioned across the filter top panel;
   the annular gasket being positioned onto the annular mouth;
   the lip being positioned atop the flange;
   the annular gasket, the flange, and the lip each being concentrically positioned with the annular mouth;
   the annular mouth, the annular gasket, the flange, and the lip being serially positioned onto each other;
   the annular gasket and the flange being secured between the annular mouth and the lip;
   the collar being attached to the jar;
   the sealing cap being attached to the filtering lid, wherein the sealing cap can be detached from the filtering lid; and
   the spout being positioned within the annular cap wall.

9. The sealed filtering and mixing jar as claimed in claim 8 comprises:
   the annular mouth comprises a jar threading;
   the annular collar wall comprises a collar threading;

the jar threading being helically connected around the annular mouth;

the collar threading being helically connected within the annular collar wall; and the jar threading being engaged with the collar threading.

10. The sealed filtering and mixing jar as claimed in claim 8 comprises:

the lip being perimetrically connected to the annular collar wall.

11. The sealed filtering and mixing jar as claimed in claim 8 comprises:

the flange comprises a centering groove;

the centering groove being positioned on the flange adjacent to the spout; and the centering groove being concentric with the spout.

12. The sealed filtering and mixing jar as claimed in claim 8 comprises:

the jar further comprises an annular jar wall and a base;

the annular jar wall being perimetrically connected to the base;

the annular mouth being positioned opposite the base along the annular jar wall; and the jar being transparent.

13. The sealed filtering and mixing jar as claimed in claim 8 comprises:

the plurality of holes traversing through the filter top panel;

the plurality of holes being concentrically arranged on the filter top panel;

each of the plurality of holes being circular; and each of the plurality of holes comprises a four millimeter diameter, wherein making the plurality of holes much larger hinders filtering, and making the plurality of holes much smaller results in clogging.

14. The sealed filtering and mixing jar as claimed in claim 8 comprises:

the annular cap wall comprises a slope;

the annular cap wall being perimetrically connected to the cap top panel; and the slope being pressed against the spout.

15. A sealed filtering and mixing jar comprises:

a jar;

a collar;

an annular gasket;

a filtering lid;

a sealing cap;

the jar comprises an annular mouth, an annular jar wall, and a base;

the annular mouth comprises a jar threading;

the collar comprises an annular collar wall and a lip;

the annular collar wall comprises a collar threading;

the filtering lid comprises a flange, a spout, a filter top panel, and a plurality of holes;

the sealing cap comprises an annular cap wall and a cap top panel;

the flange being adjacently connected around the spout;

the filter top panel being positioned opposite the flange along the spout;

the plurality of holes being positioned across the filter top panel;

the plurality of holes traversing through the filter top panel;

the annular gasket being positioned onto the annular mouth;

the lip being positioned atop the flange;

the annular gasket, the flange, and the lip each being concentrically positioned with the annular mouth;

the annular mouth, the annular gasket, the flange, and the lip being serially positioned onto each other;

the annular gasket and the flange being secured between the annular mouth and the lip;

the collar being attached to the jar;

the jar threading being engaged with the collar threading;

the sealing cap being attached to the filtering lid, wherein the sealing cap can be detached from the filtering lid; and the spout being positioned within the annular cap wall.

16. The sealed filtering and mixing jar as claimed in claim 15 comprises:

the jar threading being helically connected around the annular mouth;

the collar threading being helically connected within the annular collar wall;

the lip being perimetrically connected to the annular collar wall;

the annular jar wall being perimetrically connected to the base;

the annular mouth being positioned opposite the base along the annular jar wall; and the jar being transparent.

17. The sealed filtering and mixing jar as claimed in claim 15 comprises:

the flange comprises a centering groove;

the annular cap wall comprises a slope;

the centering groove being positioned on the flange adjacent to the spout;

the centering groove being concentric with the spout;

the annular cap wall being perimetrically connected to the cap top panel; and the slope being pressed against the spout.

18. The sealed filtering and mixing jar as claimed in claim 15 comprises:

the plurality of holes being concentrically arranged on the filter top panel;

each of the plurality of holes being circular; and each of the plurality of holes comprises a four millimeter diameter, wherein making the plurality of holes much larger hinders filtering, and making the plurality of holes much smaller results in clogging.

* * * * *